US009017083B2

United States Patent
Hayashi et al.

(10) Patent No.: US 9,017,083 B2
(45) Date of Patent: Apr. 28, 2015

(54) VEHICLE GROUNDING DEVICE HAVING A GROUNDING TERMINAL CONNECTED TO A VEHICLE BODY AND AN ELECTRONIC COMPONENT

(71) Applicant: Kabushiki Kaisha Tokai Rika Denki Seisakusho, Aichi (JP)

(72) Inventors: Kazunori Hayashi, Aichi (JP); Tatsuya Futamura, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 35 days.

(21) Appl. No.: 14/083,552

(22) Filed: Nov. 19, 2013

(65) Prior Publication Data

US 2014/0144669 A1    May 29, 2014

(30) Foreign Application Priority Data

Nov. 26, 2012   (JP) .................. 2012-257982

(51) Int. Cl.
*H01R 13/648*   (2006.01)
*B60R 16/02*    (2006.01)

(52) U.S. Cl.
CPC .......... *B60R 16/0215* (2013.01); *H01R 13/648* (2013.01)

(58) Field of Classification Search
CPC ............. H01R 23/688; H01R 23/6873; H01R 13/5682; H01R 13/65602; H01R 13/65802; H01R 4/66; H01R 13/648; H01R 4/64; H01R 4/38
USPC ............................................. 439/95–97, 108
See application file for complete search history.

(56) References Cited

U.S. PATENT DOCUMENTS

| 7,841,911 | B2 * | 11/2010 | Aizawa ......................... 439/723 |
| 8,137,116 | B2 * | 3/2012 | Omori et al. .................... 439/92 |
| 2011/0269323 | A1 * | 11/2011 | Omori et al. .................. 439/108 |
| 2011/0294317 | A1 * | 12/2011 | Nishio et al. ................... 439/95 |
| 2013/0309884 | A1 * | 11/2013 | Pamart .......................... 439/108 |

FOREIGN PATENT DOCUMENTS

| JP | 11-301379 A | 11/1999 |
| JP | 2004-040945 A | 2/2004 |

OTHER PUBLICATIONS

Japanese Office Action dated Nov. 4, 2014, for corresponding Japanese Patent Application No. 2012-257982.

* cited by examiner

*Primary Examiner* — Chandrika Prasad
(74) *Attorney, Agent, or Firm* — Morgan, Lewis & Bockius LLP

(57) ABSTRACT

A vehicle grounding device includes an attachment member electrically conductive with a vehicle body, an attached member in which an electrical component is incorporated, and an insulator configured to include a conductor being electrically conductive with the electrical component, an insulative member covering the conductor, and a grounding terminal being electrically conductive with the conductor and protruded from the insulative member. The insulator is configured to be attached to the attached member. The grounding terminal is attached to the attachment member together with an attachment portion of the attached member by fastening with a conductive fastening member in a state that the grounding terminal is overlaid on the attachment portion of the attached member, so that the electrical component is grounded to the attachment member through the grounding terminal and the fastening member.

4 Claims, 3 Drawing Sheets

VEHICLE GROUNDING DEVICE HAVING A GROUNDING TERMINAL CONNECTED TO A VEHICLE BODY AND AN ELECTRONIC COMPONENT

BACKGROUND

The present disclosure relates to a vehicle grounding device which electrically conducts an electrical component incorporated in an attached member to an attachment member which is electrically conducted to a vehicle body, thereby grounding the electrical component.

Conventionally, for example, a cruise switch is used as a member of a cruise control apparatus for enabling a vehicle to travel at a constant speed. Usually, such a cruise switch is configured as a lever switch which is disposed in the vicinity of the steering wheel, and which has various indications for operation such as "ON/OFF", "RES", "SET", and "CANCEL" in the tip end portion. Recently, it is contemplated that these indications are to be illuminated. Therefore, a cruise switch is designed so that a light emitter such as a light emitting diode is incorporated in a tip end portion of a lever of the cruise switch (hereinafter, such a lever is referred to as "cruise switch lever").

Usually, the light emitting diode incorporated in the tip end portion of the cruise switch lever is grounded by the following configuration. A lead wire connected to the negative electrode of the light emitting diode is passed through the cruise switch lever, and connected to a conductor disposed in an insulator which is installed in the lever. The conductor in the insulator is connected via a connector and a further lead wire to a steering roll connector which is disposed in the vicinity of the steering wheel, and which is electrically conductive with the vehicle body. For example, such configuration is described in JP-A-11-301379.

In the above configuration, the number of electrodes of the connector is increased in order to perform the grounding of the light emitting diode. Therefore, the size of the connector is enlarged in accordance with the increased number of the electrodes, and the attachment space for the cruise switch lever must be widened. Moreover, the lead wire from the connector is required, and hence the production cost is increased. In the steering roll connector, the channel number is increased in order to form the grounding connection, and the production cost is further increased.

SUMMARY

Present disclosure has been conducted in view of the above circumstances. Therefore, it is an object of present disclosure to provide a vehicle grounding device in which an electrical component incorporated in an attached member to be attached to an attachment member can be made electrically conductive with the attachment member which is electrically conducted to a vehicle body, to be grounded, without enlarging the size, and increasing the number of parts and the channel number.

In order to attain the object, the vehicle grounding device of the present disclosure comprising:

an attachment member being electrically conductive with a vehicle body;

an attached member in which an electrical component is incorporated; and an insulator configured to include a conductor being electrically conductive with the electrical component, an insulative member covering the conductor, and a grounding terminal being electrically conductive with the conductor and protruded from the insulative member, wherein the insulator is configured to be attached to the attached member, wherein the grounding terminal is attached to the attachment member together with an attachment portion of the attached member by fastening with a conductive fastening member in a state that the grounding terminal is overlaid on the attachment portion of the attached member, so that the electrical component is grounded to the attachment member through the grounding terminal and the fastening member.

According to the above configuration, the insulator attached to the attached member is requested to have the grounding terminal which is electrically conductive with the conductor of the insulator, and which is protruded from the insulative member of the insulator, and a connector and a lead wire are not required. The grounding terminal protruded from the insulator is overlaid on the attachment portion of the attached member, and attached to the attachment member which is electrically conductive with the vehicle body, by co-fastening by the conductive fastening member. A configuration where an insulator is electrically connected to a steering roll connector through a lead wire and a connector is not employed.

Therefore, the configuration where the grounding of the electrical component incorporated in the attached member is formed by making the component electrically conductive with the attachment member that is electrically conductive with the vehicle body can be realized without enlarging the size, and increasing the number of parts and the channel number of a steering roll connector.

DETAILED DESCRIPTION OF EXEMPLARY EMBODIMENTS

Hereinafter, an embodiment of present disclosure will be described with reference to the drawings.

Figure 2:
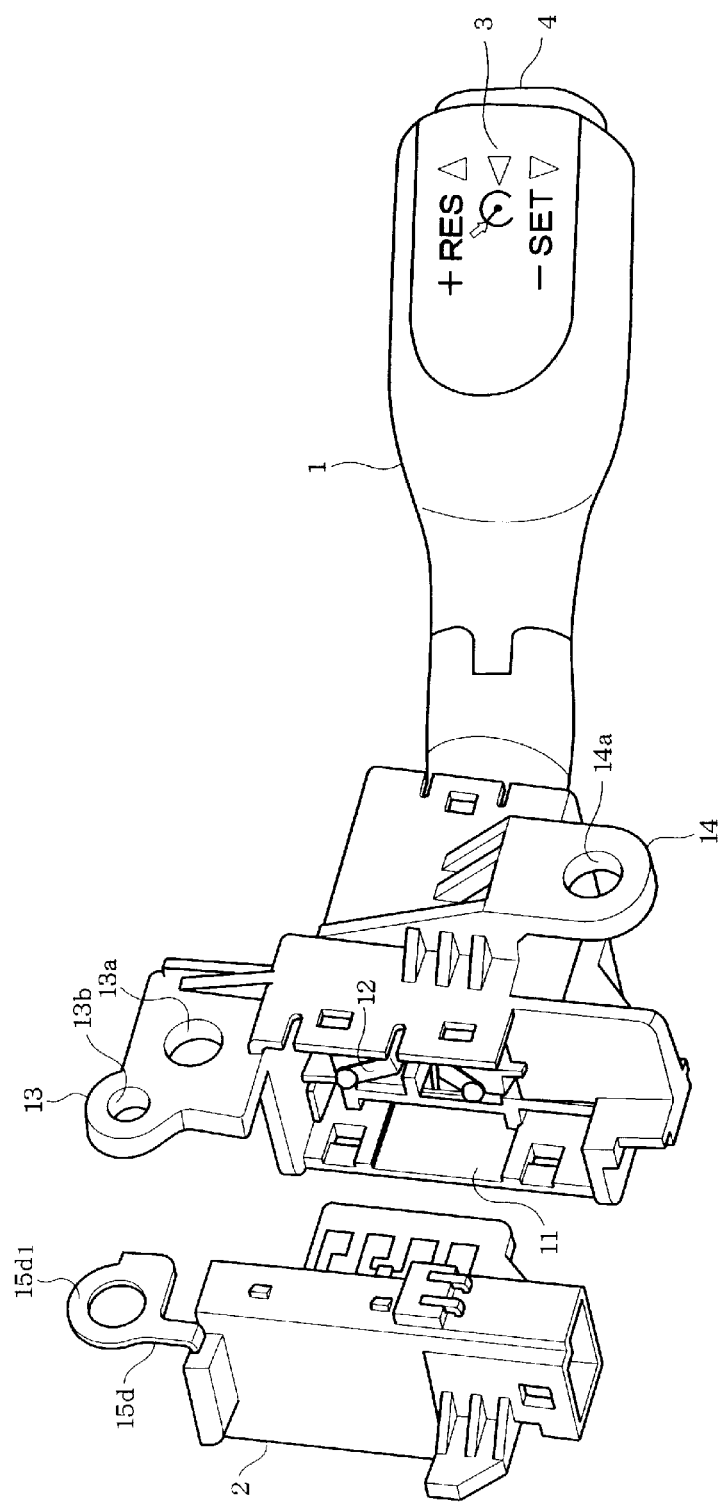
FIG. 2 is an exploded perspective view of the attached member.

First, FIG. 2 shows a cruise switch lever 1 which is an attached member, and an insulator 2 which is installed and attached to the attached member. The cruise switch lever 1 has necessary indications 3 for operation such as "+RES", a mark of an indication lamp, and "–SET", in the tip end portion. The indications 3 are translucent. The cruise switch lever 1 further has a push button 4 for turning ON/OFF in the distal tip end.

Although not illustrated in detail, the cruise switch lever 1 is hollow. In the tip end portion having the indications 3, the switch lever incorporates a light emitter which illuminates the indications 3, in this case, a light emitting diode (LED) 5 shown in FIG. 3, as an electrical component. The LED 5 is mounted on a circuit board 6 together with another necessary diode 7, a resistor 8, a switch 9 which responds to an operation applied to the push button 4, etc. Also these components are incorporated in the tip end portion of the cruise switch lever 1.

In an inner portion of the cruise switch lever 1 which extends from the tip end portion to a basal portion, lead wires 10 one ends of which are connected to the LED 5, the diode 7, the resistor 8, the switch 9, and the like are arranged through the circuit board 6. In the basal portion of the cruise switch lever 1, an insulator attaching portion 11 shown in FIG. 2 is formed, and a movable contact piece (movable contact portion) 12 is disposed in an inner portion of the insulator attaching portion 11. The movable contact piece 12 responds to a vertical and longitudinal operation of the cruise switch lever 1 which is caused by an operation by the user.

Also, attachment portions 13, 14 for enabling the whole cruise switch lever 1 to be attached to a core metal 16 of a steering wheel are outwardly protrudingly disposed in the basal portion of the cruise switch lever 1. An attachment hole 13a and a positioning hole 13b are formed in the attachment portion 13, and an attachment hole 14a is formed in the attachment portion 14.

Figure 3:
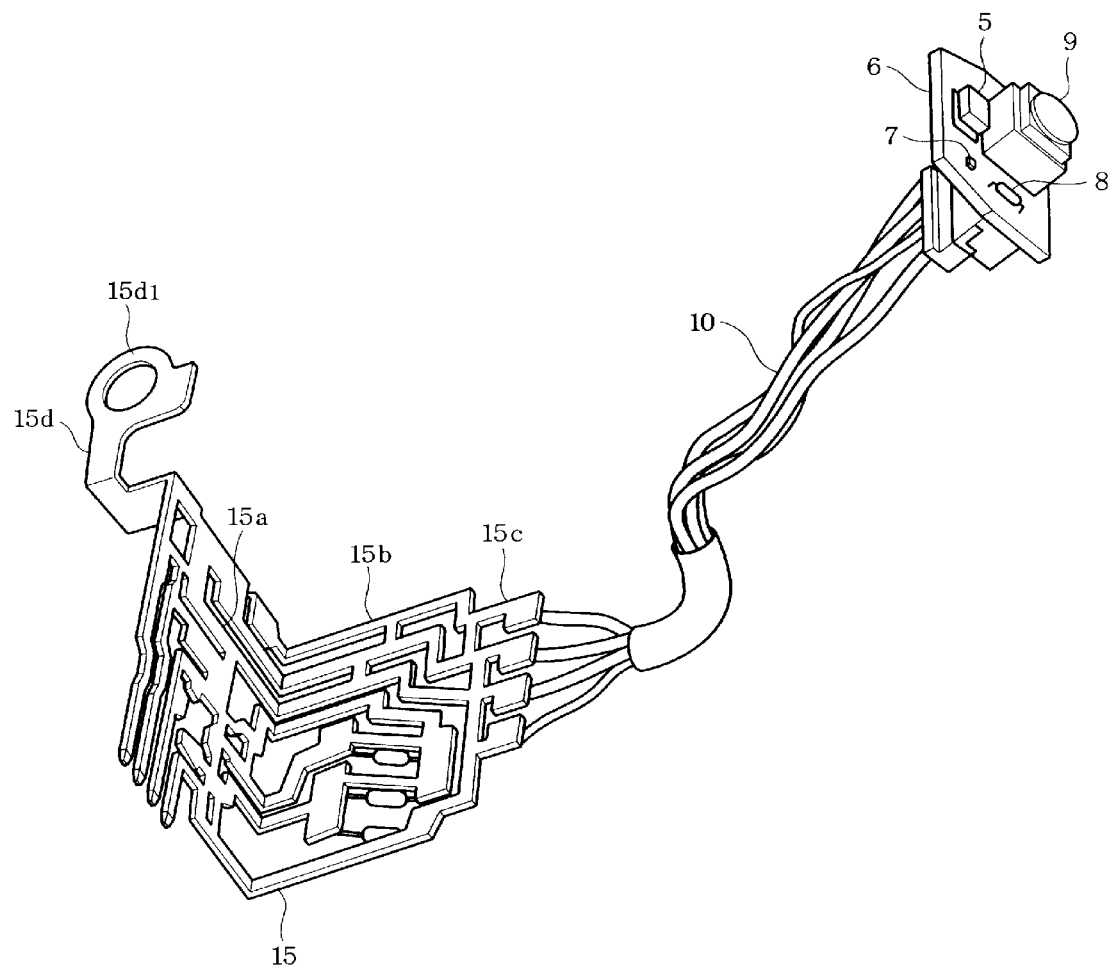
FIG. 3 is a perspective view mainly showing the internal structure of the attached member.

On the other hand, a conductor 15 shown in FIG. 3 is integrated with the insulator 2 by inserting the conductor into an insulating body of the insulator and molding by resin (plastic). The conductor 15 has a stationary-contact piece group (stationary contact portions) 15a. The stationary-contact piece group 15a corresponds to the movable contact piece 12, and is configured so that one of contacts in the cruise switch is selected by the movement of the movable contact piece 12.

As shown in FIG. 3, the conductor 15 further has a lead-wire contact terminal group 15c via a wiring portion 15b, on the side of the LED 5 with respect to the stationary-contact piece group 15a. The other ends of the lead wires 10 are connected to the lead-wire contact terminal group 15c, so that the LED 5 is electrically conductive with the conductor 15 through the lead wires 10.

The conductor 15 further has a grounding terminal 15d on the side which is opposite to the LED 5 with respect to the stationary-contact piece group 15a. The grounding terminal 15d has the same direction and dimensions as those of the attachment portion 13 of the cruise switch lever 1, and is protruded from the stationary-contact piece group 15a. The tip end portion of the grounding terminal is formed as a connecting portion 15d1 which is at the same position as the attachment hole 13a of the attachment portion 13, and which is substantially annular.

In the insulator 2, the conductor 15 having the stationary-contact piece group 15a, wiring portion 15b, lead-wire contact terminal group 15c, and grounding terminal 15d which are configured in the above-mentioned manner are insert molded by resin (plastic) as described above. The insulator 2 is attached to the cruise switch lever 1 by attaching the insulator to the insulator attaching portion 11 of the cruise switch lever 1 in the state where the other ends of the lead wires 10 are connected to the lead-wire contact terminal group 15c. In the attached state of the insulator 2 to the insulator attaching portion 11 of the cruise switch lever 1, a configuration is obtained where the grounding terminal 15d is overlaid on the attachment portion 13 of the cruise switch lever 1 (see FIG. 1). In the configuration, more specifically, the connecting portion 15d1 of the grounding terminal 15d is overlaid on the attachment hole 13a of the attachment portion 13 of the cruise switch lever 1.

Figure 1:
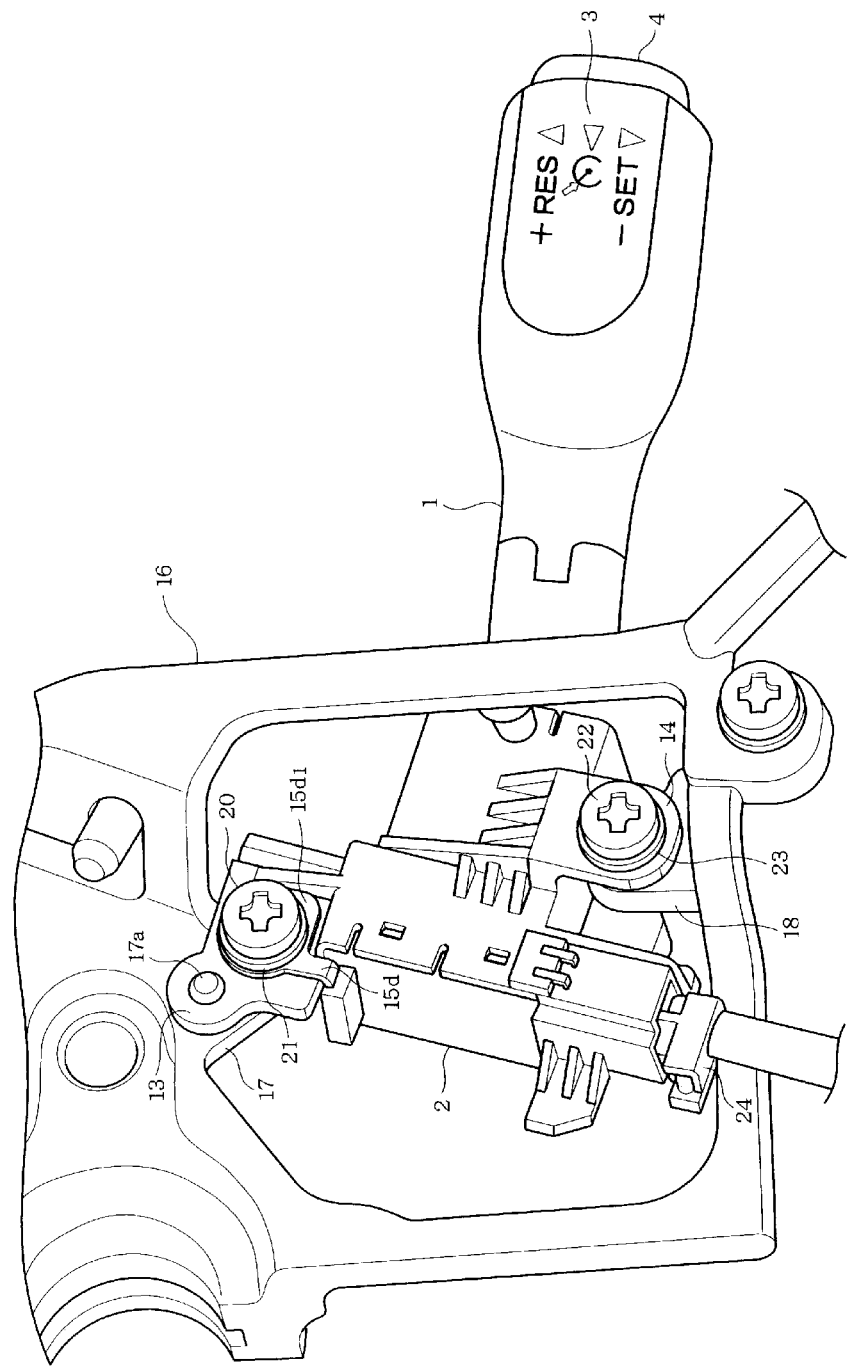
FIG. 1 is a perspective view showing an attaching state of an attached member according to an embodiment of present disclosure.

By contrast, FIG. 1 shows the core metal 16 of a steering wheel. The core metal 16 is a skeleton of the steering wheel, and functions also as an attachment member to which the cruise switch lever 1 (attached member) is to be attached. Since the core metal is attached to a metal-made steering shaft which is not shown, the core metal is electrically conductive with the vehicle body through the steering shaft. An attachment portion 17 corresponding to the attachment portion 13 of the cruise switch lever 1, and an attachment portion 18 corresponding to the attachment portion 14 of the attachment portion 14 are formed in the core metal 16. An attachment hole (not shown) corresponding to the attachment hole 13a of the attachment portion 13 of the cruise switch lever 1, and a positioning protrusion 17a corresponding to the positioning hole 13b are formed in the attachment portion 17, and an attachment hole (not shown) corresponding to the attachment hole 14a of the attachment portion 14 is formed in the attachment portion 18.

In the above configuration, the cruise switch lever 1 is attached to the core metal 16 of the steering wheel in the following manner. The positioning hole 13b of the cruise switch lever 1 is fitted onto the positioning protrusion 17a of the attachment portion 17 of the core metal 16, thereby positioning the cruise switch lever 1 with respect to the core metal 16, and the attachment hole 13a of the attachment portion 13 of the cruise switch lever 1, and the connecting portion 15d1 of the grounding terminal 15d which is overlaid on the attachment hole are made coincident with the attachment hole of the attachment portion 17 of the core metal 16. A screw (fastening member) 20 made of a metal which is a conductive material is screwingly inserted from the attachment hole 13a of the attachment portion 13 of the cruise switch lever 1 and fastened to the attachment hole of the core metal 16 via a washer 21. Furthermore, the attachment hole 14a of the attachment portion 14 of the cruise switch lever 1 is made coincident with the attachment hole of the attachment portion 18 of the core metal 16, and a screw 22 is screwingly inserted from the attachment hole 14a and fastened to the attachment hole of the core metal 16 via a washer 23.

In this way, the cruise switch lever 1 is attached to the core metal 16 of the steering wheel. As a result of the attachment, the grounding terminal 15d is co-fastened and attached to the attachment portion 17 of the core metal 16 by the screw 20 together with the attachment portion 13 of the cruise switch lever 1. By this configuration, the LED 5, which is an electrical component incorporated in the cruise switch lever 1, is grounded to the core metal 16 of the steering wheel through the circuit board 6, the lead wires 10, the conductor 15 of the insulator 2, the grounding terminal 15d, and the screw 20. Namely, the negative electrode of the LED 5 is made electrically conductive with the core metal 16 of the steering wheel.

An input terminal of a controlling apparatus of the vehicle is made electrically conductive with the positive electrode of the LED 5 through the lead wires 10 and the circuit board 6, by a connector 24 which, as shown in FIG. 1, is coupled to the insulator 2 and connected to the conductor 15.

In the configuration, as described above, from the insulator 2 which has the conductor 15 electrically conductive with the LED 5 as an electrical component incorporated in the cruise switch lever 1 as the attached member, and which is to be attached to the cruise switch lever 1, the grounding terminal 15d which is electrically conductive with the conductor 15 is protrudingly disposed, and the grounding terminal 15d is overlaid on the attachment portion 13 of the cruise switch lever 1, and co-fastened and attached to the attachment portion 17 of the core metal 16 of the steering wheel by the screw 20 configured by a conductive material, thereby enabling the LED 5 to be grounded from the grounding terminal 15d to the core metal 16 through the screw 20. Therefore, the insulator 2 is required only to have the configuration where the grounding terminal 15d which is electrically conductive with the conductor 15 is protrudingly disposed. Unlike in the possible configuration of the prior art where a conductor in an insulator is connected to a steering roll connector through a connector and a lead wire, therefore, a connector and a lead wire are not necessary. The grounding terminal 15d which is disposed protrudingly from the insulator 2 is overlaid on the attachment portion 13 of the cruise switch lever 1, and co-fastened and attached to the core metal 16 of the steering wheel by the screw 20. The configuration where the conductor is connected to the steering roll connector through the lead wire as in the above possible configuration of the prior art is not employed.

As described above, the LED 5 incorporated in the cruise switch lever 1 can be made electrically conductive with the core metal 16 of the steering wheel to be grounded, without enlarging the size, and increasing the number of parts and the channel number of the steering roll connector.

In the above configuration, when the insulator 2 is attached to the cruise switch lever 1, the grounding terminal 15*d* is overlaid on the attachment portion 13 of the cruise switch lever 1. According to the configuration, the attachment of the insulator 2 with respect to the cruise switch lever 1 enables the positioning of the grounding terminal 15*d* with respect to the attachment portion 13 of the cruise switch lever 1 to be naturally performed, and the assembling can be easily conducted.

The attached member is not limited to the cruise switch lever 1, and the electrical component is not limited to an LED. Moreover, the attachment member is not limited to a core metal of a steering wheel.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japanese Patent Application No. 2012-257982 filed on Nov. 26, 2012, the contents of which are incorporated herein by reference.

Here, the above embodiments are summarized as follows.

There is provided a vehicle grounding device, comprising:
an attachment member being electrically conductive with a vehicle body;
an attached member in which an electrical component is incorporated; and
an insulator configured to include a conductor being electrically conductive with the electrical component, an insulative member covering the conductor, and a grounding terminal being electrically conductive with the conductor and protruded from the insulative member, wherein the insulator is configured to be attached to the attached member,
wherein the grounding terminal is attached to the attachment member together with an attachment portion of the attached member by fastening with a conductive fastening member in a state that the grounding terminal is overlaid on the attachment portion of the attached member, so that the electrical component is grounded to the attachment member through the grounding terminal and the fastening member.

For example, when the insulator is attached to the attached member, the grounding terminal is overlaid on the attachment portion of the attached member.

For example, the conductor and the grounding terminal are integrally formed by a single conductive plate.

For example, the attached member has a movable contact portion and the insulator has a plurality of stationary contact portions, and when the insulator is attached to the attached member, a switch is configured by the movable contact portion and the stationary contact portions.

What is claimed is:

1. A vehicle grounding device, comprising:
an attachment member being electrically conductive with a vehicle body;
an attached member in which an electrical component is incorporated; and
an insulator configured to include a conductor being electrically conductive with the electrical component, an insulative member covering the conductor, and a grounding terminal being electrically conductive with the conductor and protruded from the insulative member, wherein the insulator is configured to be attached to the attached member,
wherein the grounding terminal is attached to the attachment member together with an attachment portion of the attached member by fastening with a conductive fastening member in a state that the grounding terminal is overlaid on the attachment portion of the attached member, so that the electrical component is grounded to the attachment member through the grounding terminal and the fastening member.

2. The vehicle grounding device according to claim 1, wherein when the insulator is attached to the attached member, the grounding terminal is overlaid on the attachment portion of the attached member.

3. The vehicle grounding device according to claim 1, wherein the conductor and the grounding terminal are integrally formed by a single conductive plate.

4. The vehicle grounding device according to claim 1, wherein the attached member has a movable contact portion and the insulator has a plurality of stationary contact portions; and
wherein when the insulator is attached to the attached member, a switch is configured by the movable contact portion and the stationary contact portions.

* * * * *